(No Model.)
J. LEDERLE & L. OBERLEIN.
Ice House.
No. 232,830. Patented Oct. 5, 1880.
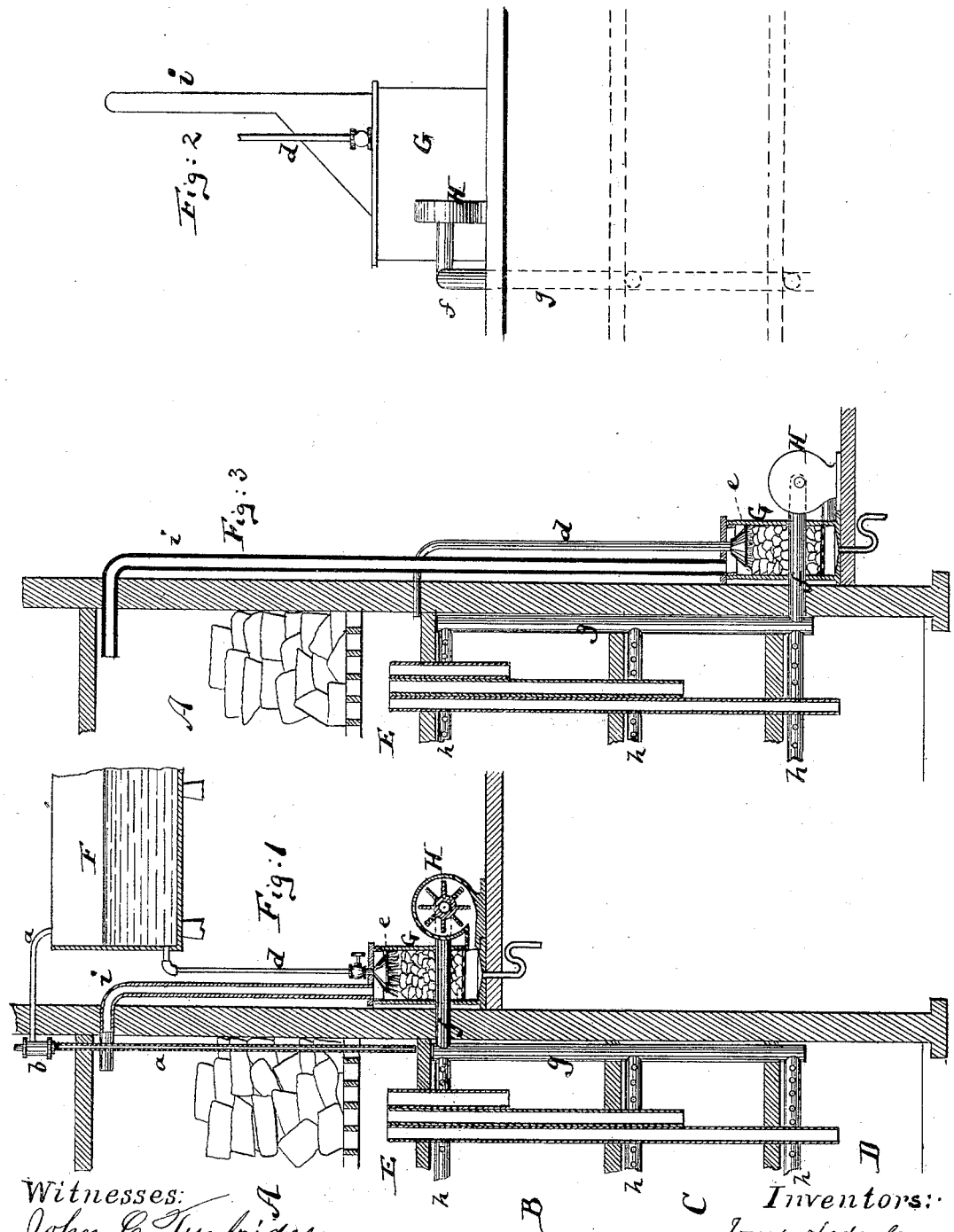
Witnesses:
John C. Tunbridge,
Harry M. Turk
Inventors:
Joseph Lederle,
Ludwig Oberlein,
by their attorney,
A. v. Briesen

UNITED STATES PATENT OFFICE.

JOSEPH LEDERLE, OF EDGEWATER, AND LUDWIG OBERLEIN, OF NEW YORK, N. Y.

ICE-HOUSE.

SPECIFICATION forming part of Letters Patent No. 232,830, dated October 5, 1880.

Application filed July 1, 1880. (No model.)

*To all whom it may concern:*

Be it known that we, JOSEPH LEDERLE, of Edgewater, in the county of Richmond and State of New York, and LUDWIG OBERLEIN, of New York, in the county and State of New York, have invented a new and useful Improvement in Ice-Houses, of which the following is a specification.

Figure 1 represents a vertical cross-section of the wall of an ice-house containing our improvement. Fig. 2 is a side view of part of the apparatus attached thereto. Fig. 3 is a cross-section of a wall of an ice-house containing a modification of our invention.

Ice-houses must be provided with means for thorough ventilation; otherwise the air in the cellars, fermenting-rooms, and store-rooms thereof will soon become damp and impure, and destroy the purity of the substances stored therein.

It is not a matter of great difficulty to properly ventilate an ice-house when the outer atmosphere is more or less in motion; but in periods of positive calm, which are not very scarce during heated terms, the exchange of impure for pure air in such ice-houses is substantially interrupted, and our invention seeks to supply a remedy for this defect by providing for artificial ventilation in times when the movement of the atmosphere is not sufficiently active to allow of automatic ventilation.

To this end our invention consists in combining an air-purifying tank or chamber with suitable conduits, supplying its contents with the melting water of the ice from the ice-house, or with other water, and with suitable conduits for taking the impure air from and carrying the pure air to the ice-house, all arranged so that the apparatus will purify merely the air of the house and cool it, but will not allow outside air to enter the ice-house unless purified by passing through the purifier.

In the drawings, the letter A represents the ice-chamber of an ice-house. B C D are the several floors of the ice-house below the ice-chamber. E is the cooling-chamber, directly below the ice-chamber, which cooling-chamber receives the drip-water from the ice.

A pipe, a, leads from the chamber E into a tank, F, and a pump or other suitable mechanism, b, may be used to pump the drip-water from the chamber E into said tank F. From this tank the drip-water flows through another pipe, d, into a sprinkler-tube, e, which is contained within a box, G, that is charged and partly filled with broken pieces of coal, which are moistened by the spray of water thrown upon them through this sprinkler-tube e. A fan, H, or other air-forcing apparatus, propelled by suitable means, draws the air, by a suitable tube, f, from the upper parts of the floors B C D, the tube f being properly joined to a flue or chimney, g, which connects with air-pipes h, that are placed in the upper parts of the several floors or store-rooms and perforated to receive the heated and spoiled air, which is thus taken from the building by the fan H. The said fan H discharges the air thus taken from the ice-house into the lower part of the purifying-box G, causing it to pass up through the stratum of moistened coal and to thereby become cooled and purified—that is to say, free from impurities with which it may have become charged in the ice-house—and the air thus purified is finally discharged by a pipe, i, into the upper part of the ice-chamber A, as shown, so that thus, by means of the said apparatus, we are able at any time, when needed, by simply starting a pump and the fan, to thoroughly purify and cool the vitiated air, which would otherwise gather and remain in the upper parts of the several store-rooms, and to utilize the reduced temperature of such air. When it is found that the air in the ice-house has been brought to the proper degree of purity, the fan and pump may again be set at rest until further occasion arises for setting them in motion.

If the pump is not required, the modification shown in Fig. 3 may be used with substantially the same effect. Said modification consists in placing the air-purifying tank G below the level of the cooling-chamber E, so that the drip-water from the ice will obtain sufficient head to flow through the pipe d, directly from the chamber E, into the sprinkler-tube e, and produce the jets or spray of water desirable for properly moistening the coal through which the air is to pass. In every other respect the apparatus is the same as shown in Fig. 1, the pipe $i$ conducting the purified air from the apparatus G into the ice-chamber, and the fan taking the impure air from the flue $g$, that joins the pipes $h$, or that otherwise, in suitable manner, takes the air from those parts of the ice-house which may contain the contaminated or impure air; but the apparatus may, if needed, be also used to purify outside air and carry it to the ice-house.

We do not limit ourselves to any particular form of ice-house, nor do we to any style or arrangement of parts for collecting the impure air so that the pipe $f$ may reach it; and we do not claim, *per se*, the purifying apparatus G, as moistened coal has, previous to our present invention, been used for cooling and purifying air, as in Patent No. 168,654; nor do we claim a dry purifier, which we know would be useless.

What we do claim is—

The combination, in an ice-house having floor A and lower floors, B C, of the pipe $f$, which leads to the floor or floors B C, containing contaminated or impure air, with the air-propelling apparatus H, purifier G, having spray-pipe $e$, and with the air-discharging pipe $i$, leading into the ice-chamber A, all arranged so that when the apparatus H is set in motion the air will be made to circulate, substantially as herein shown and described.

JOSEPH LEDERLE.
LUDWIG OBERLEIN.

Witnesses:
HARRY M. TURK,
WILLY G. E. SCHULTZ.